United States Patent
Tsuchiya

(10) Patent No.: US 10,850,536 B2
(45) Date of Patent: Dec. 1, 2020

(54) LIQUID DISCHARGE APPARATUS, METHOD OF FORMING IMAGE, AND RECORDING MEDIUM

(71) Applicant: Yuki Tsuchiya, Kanagawa (JP)

(72) Inventor: Yuki Tsuchiya, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/290,996

(22) Filed: Mar. 4, 2019

(65) Prior Publication Data

US 2019/0270316 A1    Sep. 5, 2019

(30) Foreign Application Priority Data

Mar. 5, 2018   (JP) .................................. 2018-039125

(51) Int. Cl.
| | |
|---|---|
| *B41J 2/21* | (2006.01) |
| *G06K 15/10* | (2006.01) |
| *B41J 11/00* | (2006.01) |
| *B41J 2/205* | (2006.01) |
| *B41J 3/413* | (2006.01) |
| *B41J 3/407* | (2006.01) |

(52) U.S. Cl.
CPC ........... *B41J 11/002* (2013.01); *B41J 2/2052* (2013.01); *B41J 3/407* (2013.01); *B41J 3/413* (2013.01)

(58) Field of Classification Search
CPC ..... B41J 2/2132; B41J 2/2052; G06K 15/107; G06K 15/105
See application file for complete search history.

(56) References Cited

U.S. PATENT DOCUMENTS

| | | | | |
|---|---|---|---|---|
| 2004/0041881 A1* | 3/2004 | Okuda | ....................... | B41J 2/15 347/40 |
| 2009/0244138 A1* | 10/2009 | Konno | ................... | B41J 29/393 347/12 |
| 2011/0109680 A1* | 5/2011 | Mizutani | ................ | B41J 2/2146 347/15 |

(Continued)

FOREIGN PATENT DOCUMENTS

| | | |
|---|---|---|
| JP | 2004-015410 | 1/2004 |
| JP | 2006-062332 | 3/2006 |

(Continued)

*Primary Examiner* — Jason S Uhlenhake
(74) *Attorney, Agent, or Firm* — Oblon, McClelland, Maier & Neustadt, L.L.P.

(57) ABSTRACT

A liquid discharge apparatus includes a liquid discharger, a curing device, a multi-scanning device, and processing circuitry. The multi-scanning device causes the discharger to relatively scan a non-permeable recording medium multiple times in each of two intersecting directions to form an image that includes pixels with different discharge amounts of an active energy ray curable liquid in a region of the medium. The circuitry generates thinned image data for forming the image for each relative scanning in a first direction, using a mask in which pixels allowing image formation are arrayed. The circuitry generates the thinned data such that a spatial frequency of an array of the pixels allowing image formation in the mask for a first discharge amount is uniform in relative scanning in a second direction and the spatial frequency for a second discharge amount decreases toward a downstream side in the relative scanning in the second direction.

17 Claims, 13 Drawing Sheets

(56) References Cited

U.S. PATENT DOCUMENTS

2016/0193858 A1 7/2016 Tsuchiya
2016/0243820 A1 8/2016 Yanaka et al.

FOREIGN PATENT DOCUMENTS

| JP | 2011-121233 | 6/2011 |
| JP | 2016-210016 | 12/2016 |
| JP | 2017-001288 | 1/2017 |
| JP | 2017-087445 | 5/2017 |

* cited by examiner

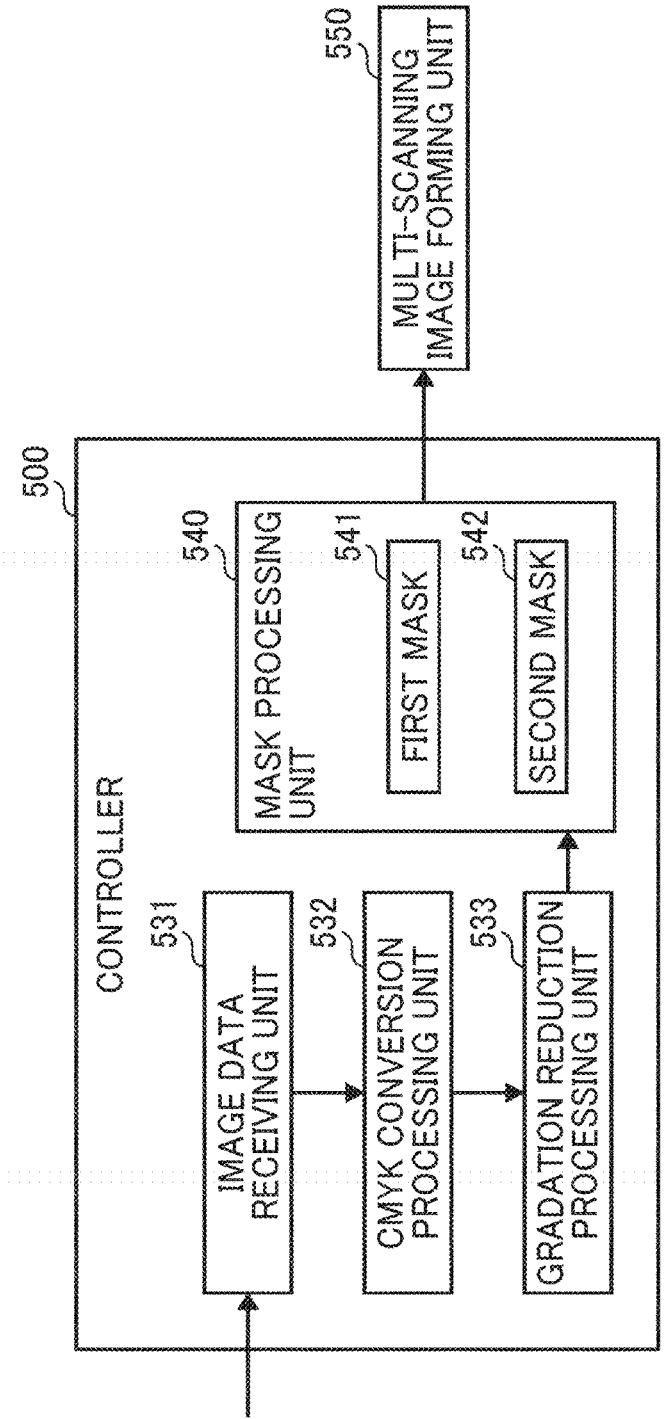

| LIQUID DROPLET TYPE | MASK | |
|---|---|---|
| LARGE DROPLET | FIRST MASK | |
| SMALL DROPLET | SECOND MASK | |

FIG. 10
| IMAGE DATA (AFTER GRADATION REDUCTION PROCESSING) | FIRST MASK | THINNED IMAGE DATA FOR LARGE DROPLETS |
|---|---|---|
FIG. 11
| IMAGE DATA (AFTER GRADATION REDUCTION PROCESSING) | SECOND MASK | SMALL DROPLET THINNED IMAGE DATA |
|---|---|---|
FIG. 12A  FIG. 12B  FIG. 12C
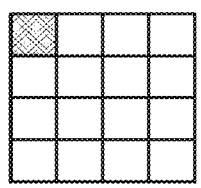
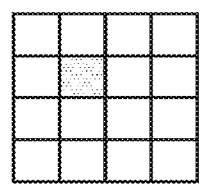
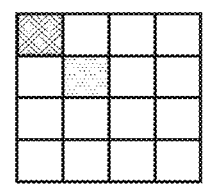

FIG. 14A
FIG. 14B
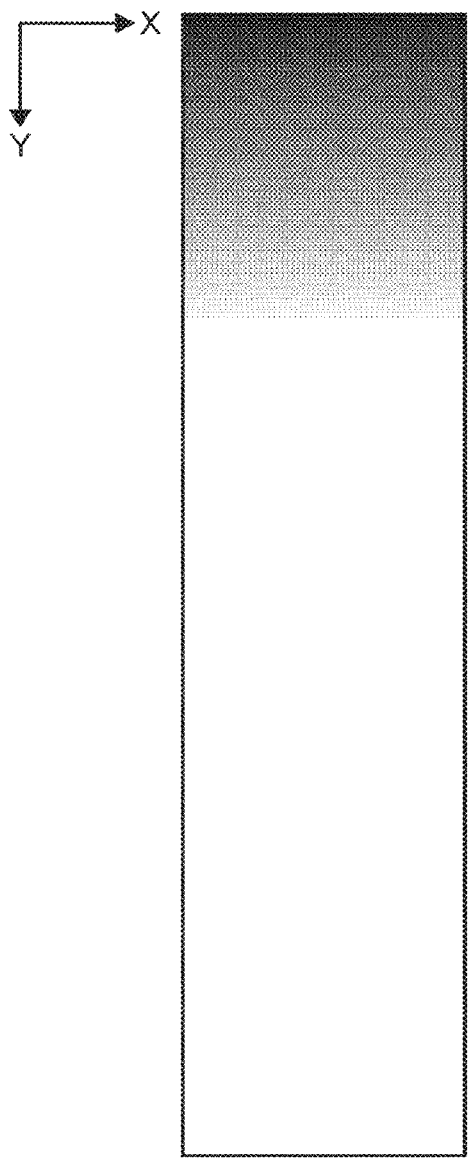
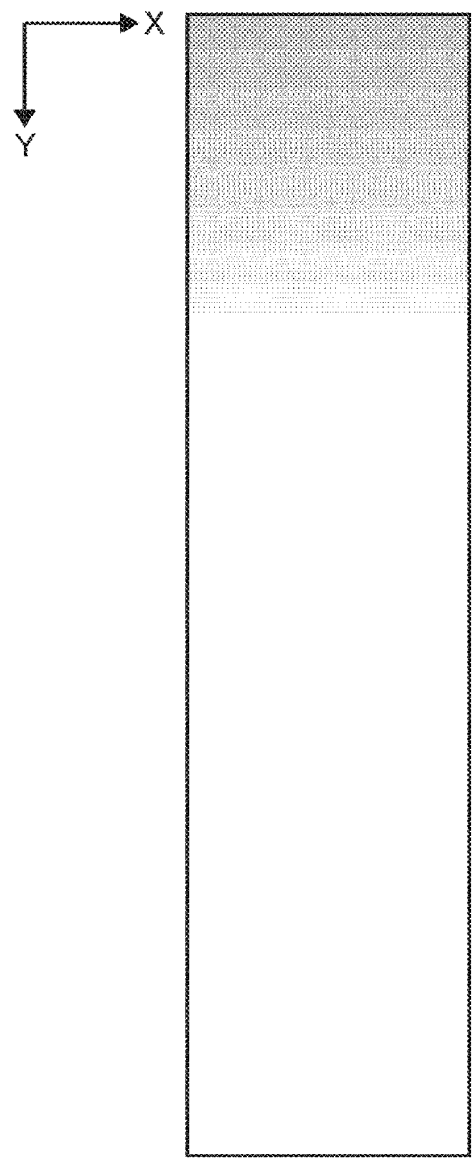

FIG. 15A
FIG. 15B
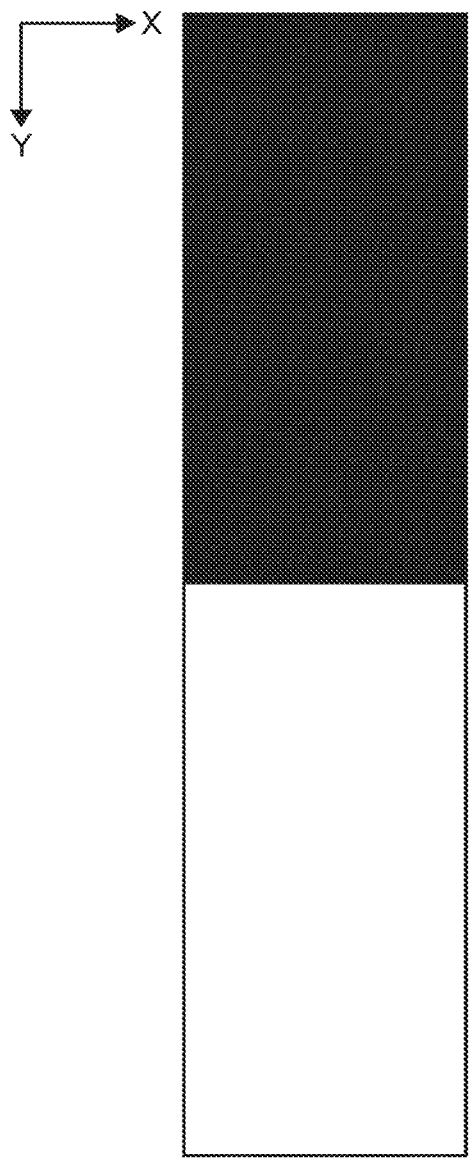
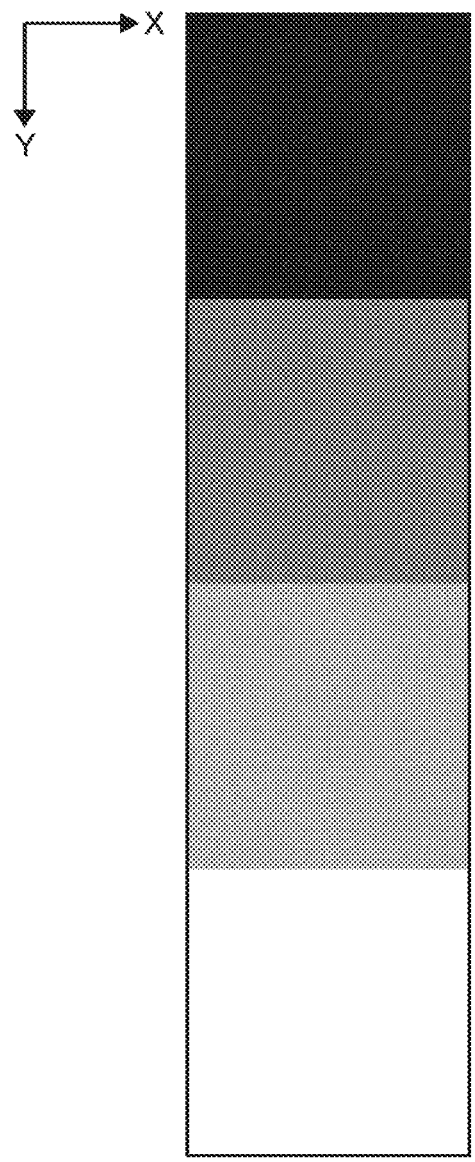

LIQUID DISCHARGE APPARATUS, METHOD OF FORMING IMAGE, AND RECORDING MEDIUM

CROSS-REFERENCE TO RELATED APPLICATIONS

This patent application is based on and claims priority pursuant to 35 U.S.C. § 119(a) to Japanese Patent Application No. 2018-039125, filed on Mar. 5, 2018, in the Japan Patent Office, the entire disclosure of which is hereby incorporated by reference herein.

BACKGROUND

Technical Field

The present disclosure relates to a liquid discharge apparatus, a method of forming an image, and a recording medium.

Discussion of the Background Art

A liquid discharge apparatus such as a liquid discharge printer discharges a liquid such as an ink onto a recording medium to form an image and the like. As such a liquid discharge apparatus, a so-called multi-scanning method of causing a liquid discharger to relatively scan the same image region of a conveyed recording medium a plurality of times, and discharging a liquid on basis of divided image data according to the relative scanning is known.

For liquid discharge apparatuses adopting the multi-scanning system, there is known a technology of making a mask pattern to be used for division of image data appropriate according to the size and density of a liquid to be landed on a recording medium, thereby to suppress deterioration of graininess and harmful influence of density unevenness on images due to conveyance errors of the recording medium.

Meanwhile, an active energy ray curable liquid discharge apparatus is known. The active energy ray curable liquid discharge apparatus discharges an active energy ray curable liquid, such as ultraviolet (UV) ray, onto a non-permeable recording medium made of a metal or a resin, irradiates the landed liquid with the active energy ray to cure the liquid, thereby to form an image on the recording medium.

SUMMARY

According to an aspect of the present disclosure, there is provided a liquid discharge apparatus that includes a liquid discharger, a curing device, a multi-scanning device, and processing circuitry. The liquid discharger is configured to discharge an active energy ray curable liquid. The curing device is configured to cure the liquid. The multi-scanning device is configured to cause the liquid discharger to relatively scan a non-permeable recording medium a plurality of times in each of two directions intersecting each other to form an image. The image includes pixels formed with different discharge amounts of the liquid in a region of the recording medium according to image data. The processing circuitry is configured to generate thinned image data for forming the image in the region for each relative scanning in a first direction of the two directions, using a mask in which pixels allowing image formation are arrayed. The processing circuitry is configured to generate the thinned image data such that a spatial frequency of an array of the pixels allowing image formation in the mask for a first discharge amount is uniform in relative scanning in a second direction of the two directions and the spatial frequency of the array of the pixels allowing image formation in the mask for a second discharge amount decreases toward a downstream side in the relative scanning in the second direction.

According to another aspect of the present disclosure, there is provided a method of forming an image. The method includes causing a liquid discharger of the liquid discharge apparatus to relatively scan a non-permeable recording medium a plurality of times both in two directions intersecting each other; forming an image including pixels formed with discharge amounts of an active energy ray curable liquid in a predetermined region of the recording medium according to image data; generating thinned image data for forming the image in a region for each relative scanning in a first direction of the two directions, using a mask in which pixels allowing formation are arrayed; and generating the thinned image data such that a spatial frequency of an array of the pixels allowing image formation in the mask for a first discharge amount is uniform in the relative scanning in a second direction of the two directions and the spatial frequency of the array of the pixels allowing image formation in the mask for a second discharge amount gradually decreases toward a downstream side in the relative scanning in the second direction.

According to still another aspect of the present disclosure, there is provided a non-transitory recording medium storing program code for causing a liquid discharge apparatus to execute: causing a liquid discharger of the liquid discharge apparatus to relatively scan a non-permeable recording medium a plurality of times both in two directions intersecting each other; forming an image including pixels formed with discharge amounts of an active energy ray curable liquid in a predetermined region of the recording medium according to image data; generating thinned image data for forming the image in a region for each relative scanning in a first direction of the two directions, using a mask in which pixels allowing formation are arrayed; and generating the thinned image data such that a spatial frequency of an array of the pixels allowing image formation in the mask for a first discharge amount is uniform in the relative scanning in a second direction of the two directions and the spatial frequency of the array of the pixels allowing image formation in the mask for a second discharge amount gradually decreases toward a downstream side in the relative scanning in the second direction.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 6 is a block diagram illustrating an example of a functional configuration of the image forming apparatus according to the first embodiment;

FIG. 10 is a diagram for describing thinned image data for large droplets by the first mask;

FIG. 11 is a diagram for describing thinned image data for small droplets by the second mask;

FIGS. 12A to 12C are diagrams for describing image data in which the thinned image data of large droplets and the thinned image data of small droplets are combined;

FIGS. 14A and 14B are diagrams for describing other examples of the second mask according to the first embodiment;

FIGS. 15A and 15B are diagrams for describing examples of a second mask according to a second embodiment;

Figure 1:
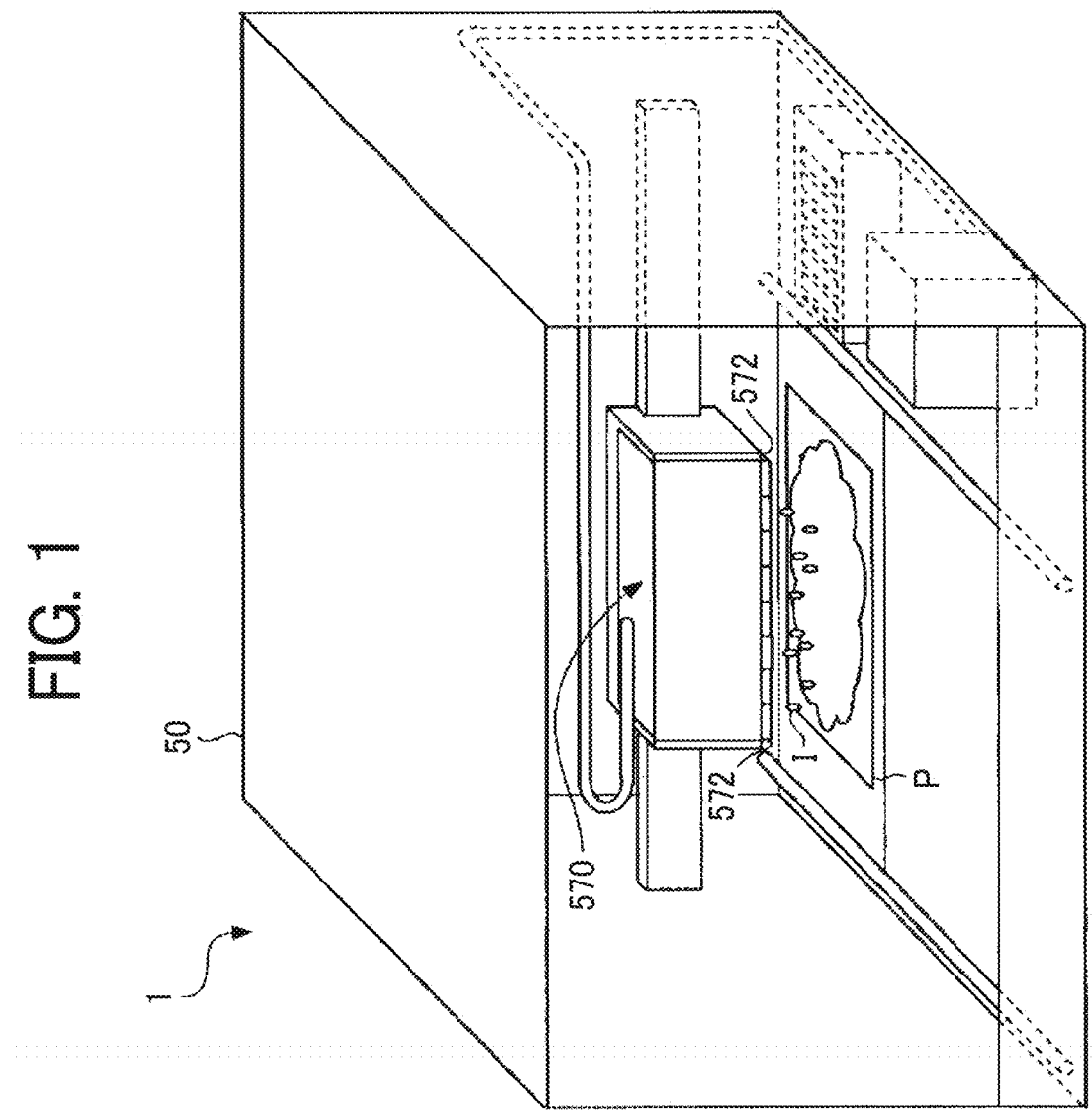
FIG. 1 is an external view of an example of an image forming apparatus according to a first embodiment.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

First Embodiment

Hereinafter, embodiments of the present disclosure will be described referring to the drawings. In the drawings, the same reference numerals are given to the same constituent parts, and redundant description may be omitted in some cases.

In the present embodiment, a case in which an apparatus that discharges a liquid is an image forming apparatus will be described as an example. In addition, a case in which the liquid is a UV curable ink that is one of the active energy ray curable liquids will be described as an example. Note that the UV curable ink may be simply referred to as ink in some cases.

An image forming apparatus according to the first embodiment will be described with reference to the drawings.

FIG. 1 is an external view of an image forming apparatus of the present embodiment. An image forming apparatus 50 is an inkjet image forming apparatus. The image forming apparatus 50 includes an ink discharge device 570 that discharges an ink I onto a recording medium P on a scanning stage 595 on the basis of image data to be formed. Further, the ink discharge device 570 includes a curing device 572 that irradiates the ink I discharged onto the recording medium P with light to cure the ink I to form an image.

A material that can be discharged by the image forming apparatus 50, has shape stability, and is cured by the light emitted by the curing device 572 is used for the ink I. The curing device 572 is a UV light irradiation device. An arbitrary material to which the discharged ink I is fixed is used for the recording medium P. The recording medium P is a non-permeable recording medium such as a plastic sheet or a metal plate.

Figure 2:
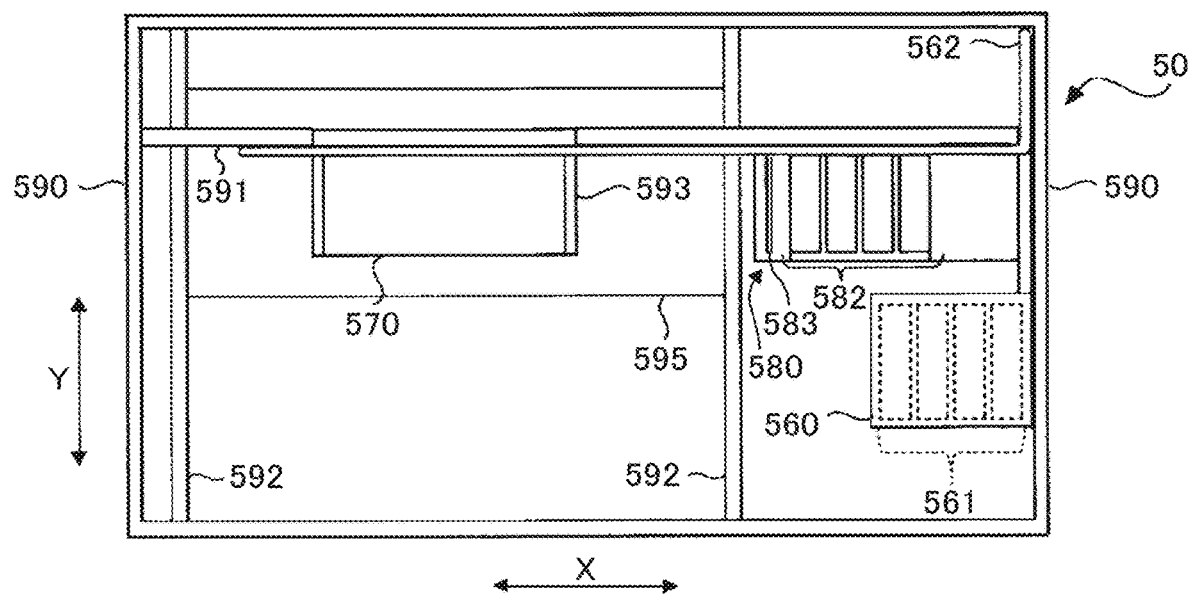
FIG. 2 is a plan view of an example of the image forming apparatus according to the first embodiment.
Figure 3:
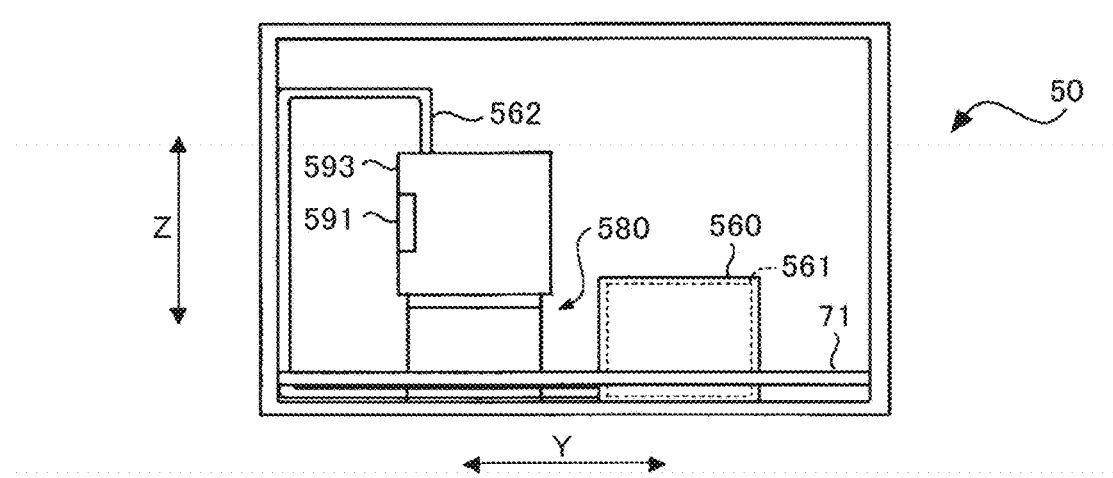
FIG. 3 is a side view of an example of the image forming apparatus according to the first embodiment.
Figure 4:
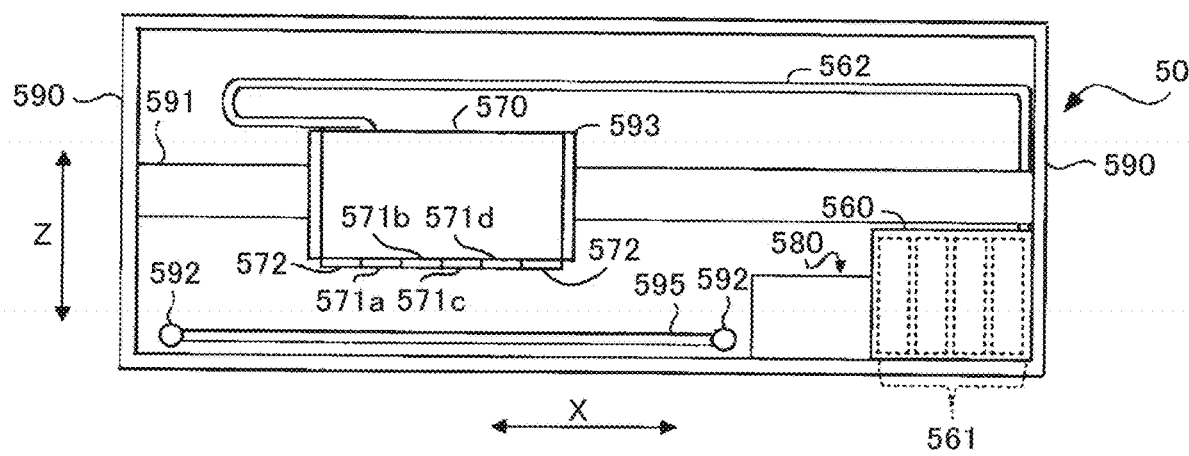
FIG. 4 is a front view of an example of the image forming apparatus according to the first embodiment.

FIGS. 2, 3, and 4 are a plan view, a side view, and a front view of the image forming apparatus 50 according to the present embodiment. To show an internal structure, a top surface of a casing of the image forming apparatus 50 in FIG. 2, a side surface of the casing in FIG. 3, and a front surface of the casing in FIG. 4 are not illustrated.

A guide member 591 is held on side surfaces 590 on both sides of the casing of the image forming apparatus 50. A carriage 593 is movably held on the guide member 591. The carriage 593 is reciprocally conveyed in the arrow X direction in FIGS. 2 and 4 (hereinafter simply referred to as "X direction" and the same applies to Y and Z) by a motor via a pulley and a belt. Note that the X direction is referred to as a main-scanning direction.

An ink discharge device 570 is held on the carriage 593 by a motor to be movable in the Z direction in FIGS. 3 and 4. Four ink discharge heads 571a, 571b, 571c, and 571d for discharging respective four types of inks are arranged in order in the X direction in the ink discharge device 570. Hereinafter, the ink discharge head is simply referred to as a "head". Further, an arbitrary head out of the heads 571a, 571b, 571c, and 571d is referred to as a head 571. The number of the heads 571 is not limited to four, and one or more arbitrary number of heads are arranged according to the number of colors of inks. Each of the ink discharge heads 571a to 571d is an example of a "liquid discharger".

A tank mounter 560 is provided in the image forming apparatus 50. A plurality of tanks 561 in which first to fourth inks are respectively accommodated is mounted in the tank mounter 560. Each ink is supplied to each head 571 via each of four supply tubes 562. Each head 571 has nozzles or a nozzle array and discharges the ink supplied from the tank 561. In the present embodiment, the heads 571a, 571b, 571c, and 571d respectively discharge inks of four colors of cyan (C), magenta (M), yellow (Y), and black (K) through the nozzles.

The curing devices 572 are respectively arranged on both sides of the four heads 571 in the ink discharge device 570. The curing device 572 cures the ink 1 discharged through the head 571 to the recording medium P. The curing device 572 is not particularly limited as long as the curing device can cure the ink, and examples of the curing device 572 include a lamp such as an ultraviolet (UV) irradiation lamp or an electron beam irradiation lamp. Types of the lamp include a high-pressure mercury lamp, an ultrahigh pressure mercury lamp, and a metal halide. Although the ultrahigh pressure mercury lamp is a point light source, UV lamps combined with an optical system to have high light use efficiency can emit light in a short wavelength range. The metal halide is effective because of a wide wavelength range. Metal halides of Pb, Sn, Fe, and the like are used for the metal halide according to an absorption spectrum of the photoinitiator contained in the ink. The curing device 572 is favorably provided with a mechanism to remove ozone that occurs due to irradiation with ultraviolet rays or the like. Note that the number of the curing devices 572 is not limited to two, and an arbitrary number of the curing devices 572 are provided according to whether to reciprocate the ink discharge device 570 to form an image or the like. Further, one of the two curing devices 572 alone may be operated.

A maintenance assembly 580 that maintains and recovers the head 571 is arranged on one side in the X direction in the image forming apparatus 50. The maintenance assembly 580 includes a cap 582 and a wiper 583. The cap 582 is brought into close contact with a nozzle surface (surface in which the nozzle is formed) of the head 571. In this state, the maintenance assembly 580 sucks the ink in the nozzle, whereby the ink having high viscosity and clogged in the nozzle is discharged. Thereafter, to form a meniscus of the nozzle, the nozzle surface is wiped with the wiper 583. In a case where the ink is not discharged, the maintenance assembly 580 covers the nozzle surface of the head 571 with the cap 582 to prevent the ink from drying.

The scanning stage 595 includes a slider movably held by two guide members 592. As a result, the scanning stage 595 is reciprocally conveyed in the Y direction (sub-scanning direction) orthogonal to the X direction by the motor via the pulley and the belt.

In the present embodiment, the first ink is black UV curable ink (K), the second ink is cyan UV curable ink (C), the third ink is magenta UV curable ink (M), and the fourth ink is yellow UV curable ink (Y). Note that the number of inks is not limited to four, and one or more arbitrary number of inks may be adopted according to types of colors required for image reproduction. Note that in a case where the number of inks is seven or more, an additional head 571 may be provided in the image forming apparatus 50. In a case where the number of inks is five or less, either one of the heads 571 may not be operated or not provided.

Figure 5:
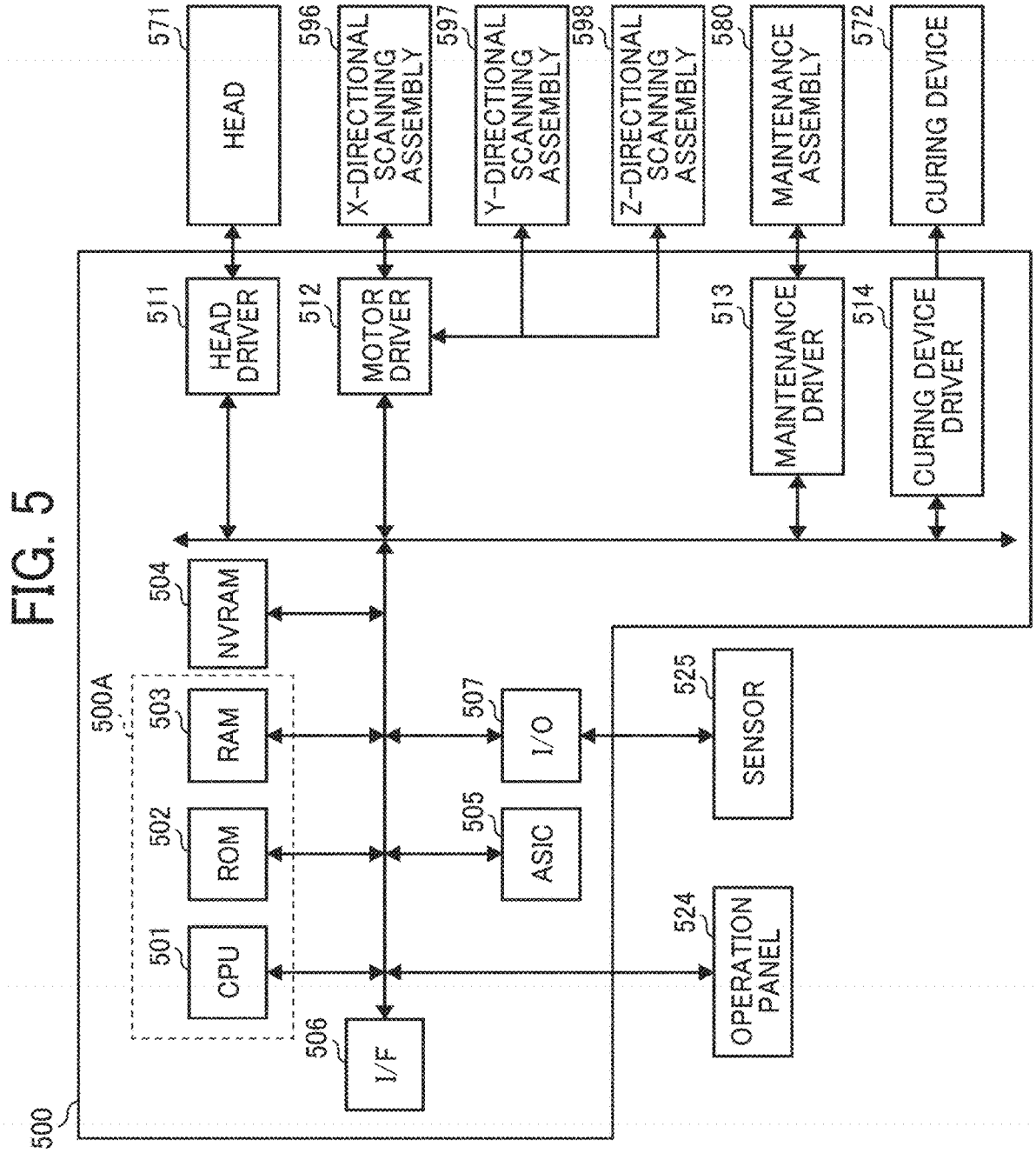
FIG. 5 is a block diagram illustrating an example of a hardware configuration of the image forming apparatus according to the first embodiment.

Next, a hardware configuration regarding control of the image forming apparatus 50 will be described with reference to FIG. 5. FIG. 5 is a hardware configuration diagram of the image forming apparatus 50.

The image forming apparatus 50 includes a controller 500 for controlling processing and operation of the image forming apparatus 50. The controller 500 includes a central processing unit (CPU) 501, a read only memory (ROM) 502, a random access memory (RAM) 503, a non-volatile random access memory (NVRAM) 504, an application specific integrated circuit (ASIC) 505, an interface (I/F) 506, and an input/output (I/O) 507.

The CPU 501 controls the entire processing and operation of the image forming apparatus 50. The ROM 502 stores a program for causing the CPU 501 to control an image forming operation and other fixed data. The RAM 503 temporarily stores image data and the like. The CPU 501, the ROM 502, and the RAM 503 constitute a main controller 500A that executes processing according to the program.

The NVRAM 504 stores data even while power of the image forming apparatus 50 is shut off. The ASIC 505 performs image processing of performing various types of signal processing for image data, and processes input/output signals for controlling the entire image forming apparatus 50.

The I/F 506 is connected to an external computer or the like, and transmits and receives data and signals to and from the computer or the like. The data sent from the computer or the like includes image data. The I/F 506 may be connected to a network such as the Internet or an intranet rather than directly connected to the external computer or the like.

The I/O 507 is connected to various sensors 525, and receives detection signals from the sensors 525. Further, an operation panel 524 for inputting and displaying required information to the image forming apparatus 50 is connected to the controller 500.

Further, the controller 500 includes a head driver 511, a motor driver 512, a maintenance driver 513, and a curing device driver 514 that operate according to commands from the CPU 501 or the ASIC 505.

The head driver 511 outputs an image signal and a drive voltage to the head 571 of the ink discharge device 570 to control discharge of the ink by the head 571. In this case, the head driver 511 outputs the drive voltage to, for example, a mechanism to form a negative pressure of a sub tank storing the ink in the head 571 and a mechanism to control pressing. Note that a substrate is also mounted on the head 571, and a drive signal may be generated by masking the drive voltage with an image signal or the like on the substrate.

The motor driver 512 outputs a drive signal to the motor of the X-directional scanning assembly 596 that moves the carriage 593 of the ink discharge device 570 in the X direction (main-scanning direction) to drive the motor. Further, the motor driver 512 outputs a drive voltage to a motor of a Y-directional scanning assembly 597 that moves the scanning stage 595 in the Y direction (sub-scanning direction) to drive the motor. Further, the motor driver 512 outputs a drive voltage to a motor of a Z-directional scanning assembly 598 that moves the ink discharge device 570 in the Z direction to drive the motor.

The maintenance driver 513 outputs a drive signal to the maintenance assembly 580 to drive the maintenance assembly 580.

The curing device driver 514 outputs a drive signal to the curing device 572 to control turning on or off of the irradiation with light by the curing device 572.

The above drivers are mutually electrically connected by an address bus, a data bus, or the like.

Examples of a means to cure the ink of the present embodiment, that is, the curable composition include heat curing and curing by an active energy ray, and the curing by active energy ray is favorable in the examples.

As the active energy ray used for curing the ink of the present embodiment, any active energy ray can be used as long as the active energy ray can impart energy required to promote polymerization reaction of a polymerizable component in the composition such as an electron beam, α ray, β ray, γ ray, or X ray, in addition to the ultraviolet ray. In particular, in a case of using a high-energy light source, the polymerization reaction can be promoted without using a polymerization initiator. Further, in the case of irradiation with the ultraviolet ray, mercury free is strongly desired from the viewpoint of environmental protection, and replacement with a gallium nitride (GaN)-based semiconductor ultraviolet light emitting device is extremely useful industrially and environmentally. Further, a ultraviolet light emitting diode (UV-LED) and a ultraviolet laser diode (UV-LD) are small in size, high in lifetime, high in efficiency, and low in cost, and are favorable as an ultraviolet light source.

Note that part or all of the control processing performed by the CPU 301 may be implemented by an electronic circuit such as a field-programmable gate array (FPGA) or an ASIC. Further, part or all of the control processing performed by the ASIC 505 may be implemented by the CPU.

The functional configuration to be described next can be implemented by the commands of the CPU and the like and the hardware configuration illustrated in FIG. 5.

FIG. 6 is a block diagram illustrating an example of a functional configuration of the image forming apparatus 50 according to the present embodiment.

The image forming apparatus 50 includes the controller 500 and a multi-scanning image forming unit 550. The controller 500 receives image data from an external computer or the like, converts the image data into image formation data, and outputs the image formation data to the multi-scanning image forming unit 550. The multi-scanning image forming unit 550 discharges the ink while relatively scanning the ink discharge device 570 with respect to a recording medium P in the main-scanning direction and the sub-scanning direction a plurality of times, thereby forming an image on the recording medium P. The multi-scanning image forming unit 550 can be implemented by, for example, the ink discharge device 570, the X-directional scanning assembly 596, the Y-directional scanning assembly 597, and the like. Note that the multi-scanning image forming unit 550 is an example of a "multi-scanning device". Further, the main-scanning direction and the sub-scanning direction are an example of "two intersecting directions". The main-scanning direction is an example of "a predetermined direction of the two directions", and the sub-scanning direction is an example of "the other direction of the two directions".

The controller 500 includes an image data receiving unit 531, a CMYK conversion processing unit 532, a gradation reduction processing unit 533, and a mask processing unit 540.

The image data receiving unit 531 receives image data of so-called RGB color having red (R), green (G), and blue (B) for forming an image from the external computer or the like via the I/F 506, and outputs the image data to the CMYK conversion processing unit 532.

The CMYK conversion processing unit 532 converts the input image data of RGB color into a so-called CMYK color image of cyan (C), magenta (M), yellow (Y), and black (K). For example, the CMYK conversion processing unit 532 converts a 24-bit image of RGB color into a CMYK color image having 8 bits in each color, using a look up table (LUT) or the like. The converted image is output to the gradation reduction processing unit 533.

The gradation reduction processing unit 533 executes processing of reducing the gradation of the input image data. In the present embodiment, pixels constituting an image are expressed by volumes of four types of ink droplets. There are four types of volumes of ink droplets: a small droplet, a medium droplet, a large droplet, and no droplets. The small droplet is an ink droplet with the smallest volume, the medium droplet is an ink droplet formed by combining two small droplets, and the large droplet is the ink droplet with the largest volume formed by combining three small droplets. Each pixel is expressed by the four types of ink droplets including no droplets in which no ink droplets are discharged in addition to the aforementioned three types of ink droplets, that is, by 2 bits. That is, the gradation reduction processing unit 533 converts the CMYK color image having 8 bits in each color into a CMYK color image having 2 bits in each color.

The mask processing unit 540 executes masking processing for the image for which the gradation reduction processing of each color has been performed.

Figure 7A:
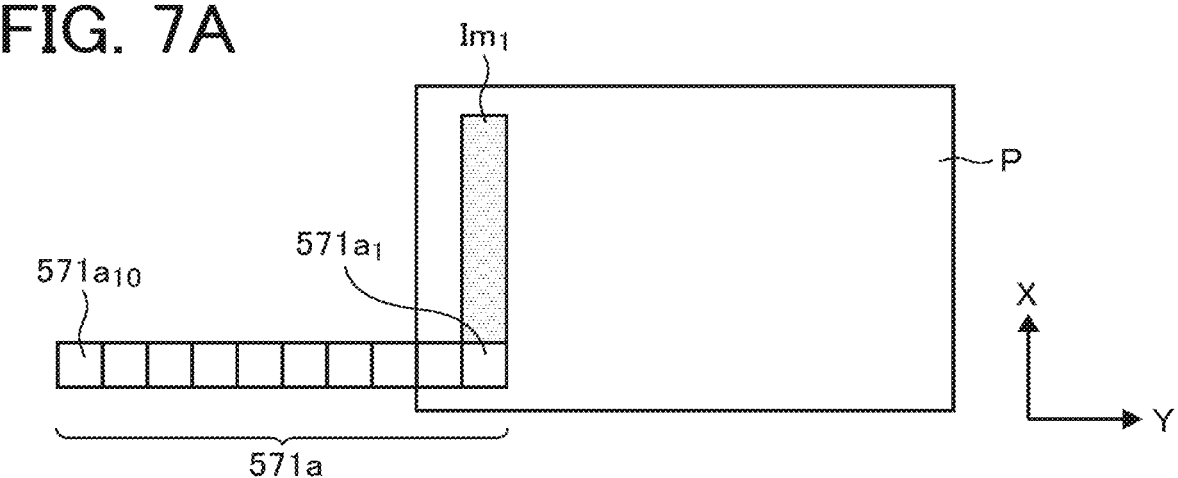
FIGS. 7A to 7C are diagrams for describing an example of a multi-scanning operation.
Figure 7B:
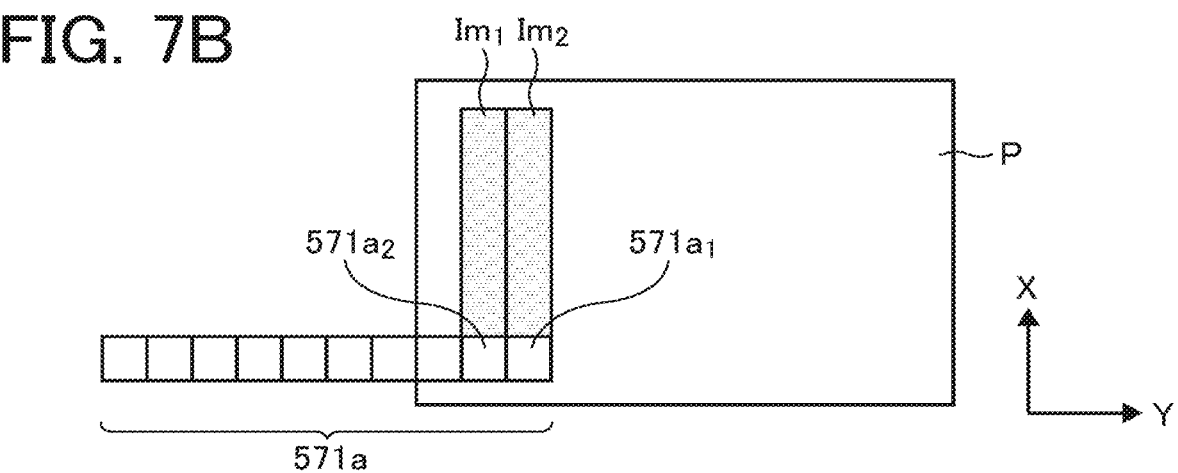
Figure 7C:
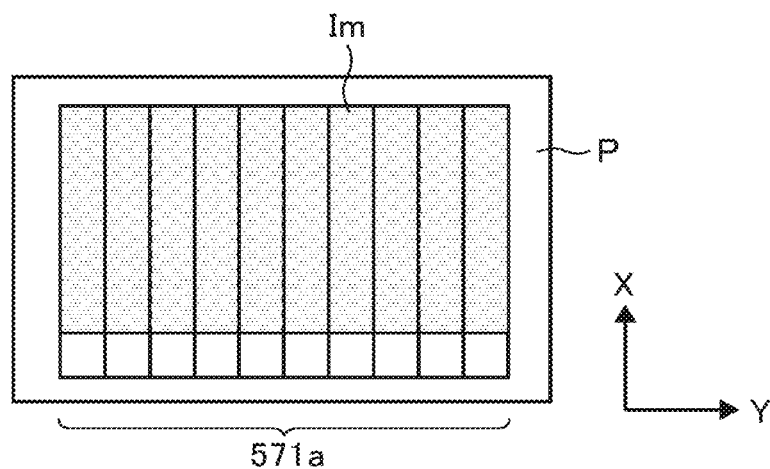

Here, the multi-scanning will be described referring to FIGS. 7A to 7C. FIGS. 7A to 7C schematically illustrate states in which the ink discharge device 570 is scanned in the X and Y directions, and an image Im is formed on the recording medium P. For the sake of simplicity, FIGS. 7A to 7C exemplarily illustrate the head 571a alone having the ink discharge device 570. However, content described below is similarly applied to the other heads 571b to 571d.

The head 571a has a plurality of nozzles arrayed in the Y direction. In addition, the head 571a has a region divided by a number according to the number of times of scanning in the Y direction. In FIGS. 7A to 7C, the number of times of scanning in the Y direction is nine, and the head 571a is divided into ten nozzle regions 571a1 to 571a10. In a case where the number of nozzles arrayed in the Y direction is one hundred in the head 571a, for example, ten nozzles are included in one nozzle region.

In FIG. 7A, the head 571a is scanned in the X direction, and an image Im1 is formed by the ten nozzles in the nozzle region 571a1. From the state of FIG. 7A, the head 571a is scanned in the Y direction by a distance corresponding to the length of one nozzle region in the Y direction. FIG. 7B illustrates a state after scanning in the Y direction.

In FIG. 7B, the head 571a is scanned in the X direction, and an image Im2 is formed by the ten nozzles in a nozzle region 571a1. Further, the image Im1 is formed by the ten nozzles in a nozzle region 571a2. From the state of FIG. 7B, the head 571a is scanned in the Y direction by a distance corresponding to a length of one nozzle region in the Y direction. Similarly, in the state after scanning, images Im1 to Im3 are formed by the nozzle regions 571a1 to 571a3.

FIG. 7C illustrates a state after the entire image Im is formed after repetition of the above operation.

An image Imn (n=1 to 9) divided into the regions as described above is formed little by little by each nozzle region by ten times of scanning in the X direction. Therefore, the image data for forming the image Imn is divided into image data for each scanning so that image formation is completed by ten times of scanning in the X direction. The image data divided in this way is called thinned image data. The processing of generating the thinned image data from the original image data is referred to as mask processing.

In the above description, an example in which the nozzle region of the head is divided into ten regions and the image is formed by the ten times of scanning has been described. However, the number of divisions of the nozzle regions and the number of times of scanning are not limited to the example, and can be arbitrarily changed according to the head to be used and the image to be formed.

In the above description, an example in which the recording medium is secured and the head is scanned in the main-scanning direction and the sub-scanning direction has been described. However, the embodiment is not limited to the example. The head may be secured and the recording medium may be scanned in the main-scanning direction and the sub-scanning direction. Alternatively, a combination of the head being scanned in the main-scanning direction and the recording medium being scanned in the sub-scanning direction, or the like may be adopted.

Further, in the above description, an example in which the scanning in the X direction is one-way scanning in the +X direction in FIGS. 7A to 7C has been described. However, the scanning in the X direction may be bidirectional scanning in the +X direction and the –X direction. That is, in the state of FIG. 7A, the ink discharge head 571a is scanned in the +X direction to form an image, and in the next state of FIG. 7B, the ink discharge head 571a is scanned in the –X direction to form an image. Performing image formation while alternately performing scanning in the +X direction and in the −X direction as described above is referred to as bidirectional scanning.

Referring back to FIG. 6, the mask processing unit 540 of the present embodiment executes the mask processing using a different mask for each type of ink droplet. A first mask 541 is a mask applied to image data of an image formed with the large droplets and a second mask 542 is a mask applied to image data of an image formed with the small droplets. Note that the data of the first mask 541 and the second mask 542 are stored in the ROM 502 or the RAM 503. Alternatively, the data of the first mask 541 and the second mask 542 may be read from an external computer, a network, or the like via the I/F 506. The mask processing unit 540 is an example of "masking processor".

Figures 8, 9:
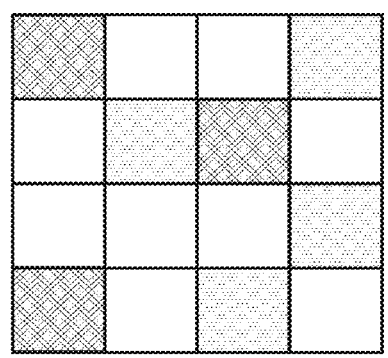
FIG. 8 is a diagram for describing a first mask and a second mask.
FIG. 9 is a diagram for describing image data.

FIG. 8 illustrates examples of the first mask 541 and the second mask 542. The 4×4 matrix illustrated in FIG. 8 is a mask applied to an image region of 4×4 pixels. FIG. 8 illustrates part of masks applied to the entire image data of an image to be formed. Pixels displayed in black are pixels that allow image formation, while pixels that are displayed in white are pixels that do not allow image formation. As illustrated in FIG. 8, the first mask for large droplets and the second mask for small droplets differ in pixels that allow image formation.

FIG. 9 illustrates an example of image data after gradation reduction processing formed with 4×4 pixels. FIG. 9 illustrates part of the image data of an image to be formed. Pixels displayed in black are pixels where the ink with the large droplets are discharged to adhere to the recording medium P to form an image. Pixels displayed in gray are pixels where the ink with the small droplets are discharged to adhere to the recording medium P to form an image. Pixels displayed in white are pixels with no droplets, that is, pixels where the ink is not allowed to adhere to the recording medium P.

FIG. 10 illustrates an example in which the first mask is applied to the image data in FIG. 9. Pixels displayed in black in the image data are pixels where an image is formed with the large droplets. Further, in the first mask, pixels displayed in black are pixels where the image formation with the large droplets is allowed. Thinned image data for large droplets is obtained by a logical conjunction of both the pixels. The pixel formed with the large droplets in one time of scanning in the X direction is one pixel displayed in black.

FIG. 11 illustrates an example in which the second mask is applied to the image data in FIG. 9. Pixels displayed in black in the image data are pixels where an image is formed with the small droplets. Further, in the second mask, pixels displayed in black are pixels where image formation with the small droplets is allowed. Thinned image data for small droplets is obtained by a logical conjunction of both the pixels. The pixel formed with the small droplets in one time of scanning in the X direction is one pixel displayed in gray.

FIGS. 12A to 12C are an example illustrating a logical addition of the thinned image data for large droplets and the thinned image data for small droplets. FIG. 12A illustrates the thinned image data for large droplets and FIG. 12B illustrates the thinned image data for small droplets. FIG. 12C is the logical addition of FIG. 12A and FIG. 12B, and illustrates image data of an image formed with the large droplets and small droplets in one time of scanning.

The mask is different in every scanning in the X direction, and the pixels where the image formation is allowed with the masks are in a complementary relationship to one another. Image formation in a predetermined image region is completed by a plurality of times of scanning in the X direction. Scanning at an early number of times in the plurality of times of scanning in the X direction is referred to as upstream in the scanning in the Y direction, and scanning at a late number of times is referred to as downstream in the scanning in the Y direction. An earlier number of times of scanning is more upstream in the scanning and a later number of times of scanning is more downstream in the scanning in the plurality of times of scanning in the X direction.

Here, characteristics inherent in the case of forming an image on a non-permeable recording medium with an UV curable ink and harmful influence on the image caused by the characteristics will be described. The inherent characteristics include (1) increase tendency in the diameter of landed ink droplets, (2) poor landing position accuracy of the ink droplets, (3) occurrence of gloss unevenness, and the like. (1) is due to difficulty in penetration of ink into the non-permeable recording medium, easy wetting and spreading, and the like. (2) is due to easy charging of the non-permeable recording medium made of metals and resin materials, and easy movement of the landed ink droplets by an electrostatic force caused by the charging. (3) is due to change in glossiness due to variation in the shape and position of a dome in order to cure the dome-shaped UV ink on the recording medium after landing. In the image formation onto the non-permeable recording medium with the UV curable ink, such characteristics may cause the deterioration of graininess and the harmful influence on the image such as the gloss unevenness.

Figure 13A:
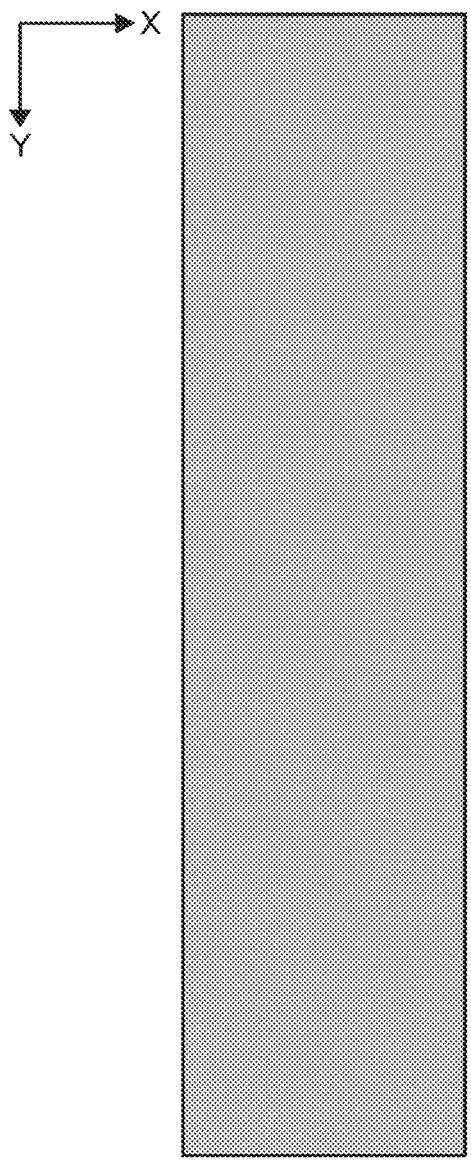
FIGS. 13A and 13B are diagrams for describing examples of the first mask and the second mask according to the first embodiment.
Figure 13B:
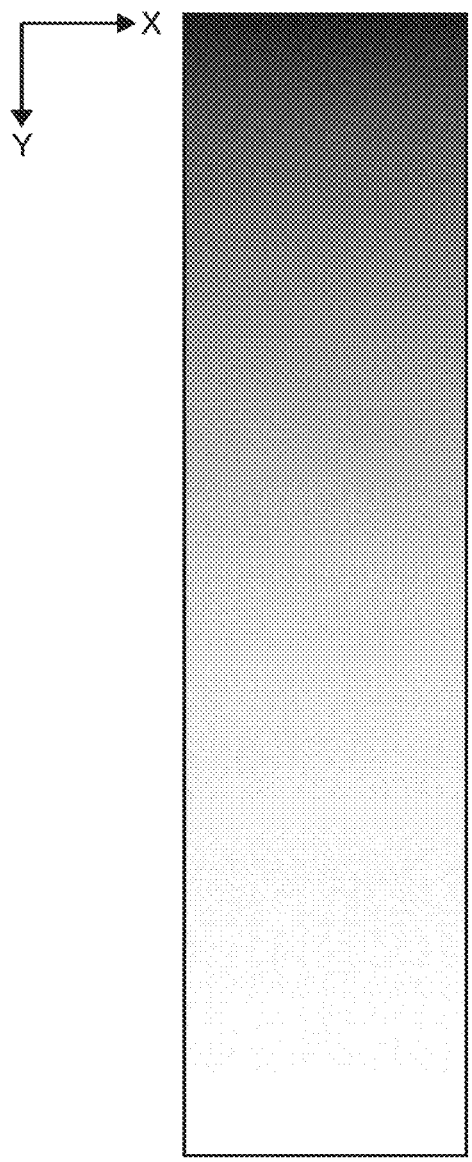

FIGS. 13A and 13B illustrate examples of masks applied to the entire image data of an image to be formed in the present embodiment. FIG. 13A is a first mask applied to image data of an image formed with the large droplets. FIG. 13B is a second mask applied to image data of an image formed with the small droplets. In FIGS. 13A and 13B, the X direction represents the main-scanning direction, and the Y direction represents the sub-scanning direction.

Similarly to FIG. 8, pixels displayed in black are pixels that allow image formation. However, as compared with FIG. 8, the size of one pixel is reduced. Therefore, in FIGS. 13A and 13B, a region observed to be darker is a region having many pixels allowing the image formation, that is, a dense region, and a region observed to be lighter is a region having few pixels allowing the image formation, that is, a sparse region. In other words, the "region having many pixels allowing the image formation" is a region where a spatial frequency of the array of the pixels allowing the formation is high, and the "region having few pixels allowing the image formation" is a region where the spatial frequency of the array of the pixels allowing the formation is low.

The region is observed in uniform gray in whole with the first mask of FIG. 13A. This indicates that the spatial frequency of the array of the pixels allowing the formation is uniform from the upstream side to the downstream side in the scanning in the Y direction. The pixels are formed with a uniform probability regardless of the region with the mask with the uniform spatial frequency. Since the discharged ink can be landed on the recording medium with a certain interval secured, coalescence of the ink droplets after landing can be suppressed.

Here, the coalescence of the ink droplets means that a plurality of ink droplets landed on the recording medium are combined into one. The ink droplets easily coalesce if the interval between the ink droplets after landing is short. Further, the ink droplets get wet and spread and adjacent ink droplets easily coalesce if the ink amount in the ink droplets after landing is large.

In the present embodiment, the mask with a uniform spatial frequency is applied to an image pattern of the image formed with the large droplets having a large ink amount in the ink droplets, thereby suppressing the coalescence of the ink droplets after landing. The graininess of the formed image can be made favorable by the suppression of the coalescence of the ink droplets. The large droplets are an example of a "first discharge amount", and the first mask is an example of a "mask for the first discharge amount".

Meanwhile, in the second mask of FIG. 13B, a region in the −Y direction, that is, the upstream side in the scanning in the Y direction is observed to be darker, and a region in the +Y direction, that is, the downstream side is observed to be lighter. This indicates that the spatial frequency of the array of the pixels allowing the formation gradually decreases toward a downstream side in the scanning in the Y direction. In other words, the spatial frequency of the array of the pixels allowing the formation becomes lower little by little toward the downstream side in the scanning in the Y direction.

The lower the spatial frequency toward the downstream side indicates that the number of ink droplets to be landed becomes smaller toward the end of the image formation. When the number of ink droplets to be landed is small, the probability of landing the ink droplets at an intended position increases, and variation in landing of the ink droplets can be suppressed. Thereby, the density unevenness and the gloss unevenness of the formed image can be suppressed. In particular, in a bidirectional scanning method of discharging an ink in bidirectional scanning in the X direction to form an image, the effect of suppression of the density unevenness and the gloss unevenness becomes remarkable.

In the present embodiment, the mask with the spatial frequency of the array of the pixels allowing the formation, the spatial frequency gradually decreasing toward the downstream side in the scanning in the Y direction, is applied to an image pattern of the image formed with the small droplets. Thereby, the landing accuracy of the small droplets that tends to cause the landing variation of the ink droplets is improved, and the density unevenness and the gloss unevenness of the formed image are suppressed. The small droplets are an example of a "second discharge amount", and the second mask is an example of a "mask for the second discharge amount".

As described above, in the present embodiment, the first discharge amount, that is, the spatial frequency of the mask with respect to the large droplets is made uniform in relative scanning in the Y direction, and the second discharge amount, that is, the spatial frequency of the mask with respect to the small droplets decreases toward the downstream side in the relative scanning in the Y direction. Thereby, the enlargement of the large droplets after landing is suppressed, the deterioration of graininess due to the coalescence is prevented, the landing position accuracy of the small droplets is improved, and the gloss unevenness can be suppressed. That is, in forming an image on the non-permeable recording medium with the UV curable ink, the deterioration of graininess and the harmful influence on the image due to the inherent characteristics such as the increase tendency in the diameter of landed ink droplets, the poor landing position accuracy of the ink droplets, and the occurrence of gloss unevenness can be suppressed.

Note that the gradation in the Y direction in the second mask in FIG. 13B, that is, the change in the spatial frequency may have side effects such as coalescence of the landed ink droplets. Therefore, it is desirable to properly design the way of changing the spatial frequency to be gradually low while considering the effects and side effects on intended image characteristics For example, FIGS. 14A and 14B illustrate examples of the second masks having different ways of changing the spatial frequency to be gradually low. Similarly to FIGS. 13A and 13B, the X direction represents the main-scanning direction, and the Y direction represents the sub-scanning direction.

In FIG. 14A, the spatial frequency gradually decreases toward the downstream side up to ½ of the scanning in the Y direction, and the image formation is completed by the ½ of the scanning in the Y direction. Meanwhile, in FIG. 14B, the spatial frequency gradually decreases toward the downstream side throughout the scanning in the Y direction, and the image formation is completed using the entire scanning in the Y direction. The way of changing the spatial frequency to gradually decreases toward the downstream side can be designed according to the intended image characteristics in this manner.

Further, FIGS. 13A and 13B illustrate examples of using the first mask with a uniform spatial frequency in the scanning in the Y direction for the large droplets, and using the mask with a spatial frequency in the scanning in the Y direction, the spatial frequency gradually decreasing toward the downstream side, for the small droplets. However, the embodiment is not limited to the examples. The mask with a uniform spatial frequency in the scanning in the Y direction may be used for the small droplets, and the mask with a spatial frequency in the scanning in the Y direction, the spatial frequency gradually decreasing toward the downstream side, may be used for the large droplets, depending on the intended image characteristics.

Further, in the above description, examples of using the masks for the large droplets and the small droplets have been described. However, the masks may be used for other types of ink droplets such as the medium droplets. For example, the mask with a uniform spatial frequency in the scanning in the Y direction is used for the large droplets, and the mask with a spatial frequency in the scanning in the Y direction, the spatial frequency gradually decreasing toward the downstream side, is used for the small and medium droplets. In this case, the way of changing the spatial frequency of the mask may be differentiated between the small droplets and the medium droplets.

Second Embodiment

Next, an image forming apparatus according to a second embodiment will be described. Note that description of the same constituent parts as the parts already described in the first embodiment may be omitted.

In the first embodiment, as illustrated in FIG. 13B and FIGS. 14A and 14B, the gradation-type second mask with the spatial frequency that gradually changes toward the downstream side in the sub-scanning direction has been described. In contrast, in the present embodiment, a step-type second mask having a spatial frequency that changes stepwise toward the downstream side in a sub-scanning direction is used.

FIGS. 15A and 15B illustrate examples of the step-type mask of the present embodiment. Similarly to FIGS. 13A and 13B, an X direction represents a main-scanning direction, and a Y direction represents a sub-scanning direction.

FIG. 15A is an example of a mask having two types of spatial frequencies in one step. FIG. 15B is an example of a mask having four types of spatial frequencies in three steps.

Switching of the spatial frequency of the mask is performed with switching of scanning in the X direction. Therefore, the spatial frequency of the mask is uniform in one time of scanning in the X direction.

Taking the nozzles illustrated in FIGS. 7A to 7C as an example, in the case of FIG. 7A, the mask applied to image data of an image formed by discharge of the nozzle regions 571a1 to 571a5 is a common mask with a high spatial frequency. The mask applied to image data of an image formed by discharge of nozzle regions 571a6 to 571a10 is a common mask with a low spatial frequency.

Similarly, in the case of FIG. 7B, the mask applied to image data of an image formed by discharge of the nozzle regions 571a1 to 571a3 is a common mask with a high spatial frequency. The mask applied to image data of an image formed by discharge of the nozzle regions 571a4 and 571a5 is a common mask with a lower spatial frequency than the mask for the nozzle regions 571a1 to 571a3. The mask applied to image data of an image formed by discharge of the nozzle regions 571a6 to 571a8 is a common mask with a lower spatial frequency than the mask for the nozzle regions 571a4 and 571a5. The mask applied to image data of an image formed by discharge of the nozzle regions 571a9 and 571a10 is a common mask with a lower spatial frequency than the mask for the nozzle regions 571a6 to 571a8.

By changing the spatial frequency stepwise, averaging of density between adjacent pixels is suppressed and contrast of the image can be increased, for example. As a result, an image with sharper contours, edges, or the like can be formed.

Note that effects other than the above-described effect are the same as the effects described in the first embodiment.

Third Embodiment

Next, an image forming apparatus according to a third embodiment will be described. Note that description of the same constituent parts as the parts already described in the first and second embodiments may be omitted.

In the present embodiment, an array pattern of pixels allowing formation in a mask is a random pattern in a mask used for image data of an image formed with large droplets, and is a simple pattern in a mask used for image data of an image formed with small droplets. Here, the random pattern is a pattern in which pixels allowing formation are randomly arranged, that is, without regularity. A spatial frequency characteristic of the random pattern is a so-called white noise-like characteristic having no peak at a specific frequency or frequency band. The simple pattern is a pattern in which pixels allowing formation are regularly arranged. A spatial frequency characteristic of the simple pattern is a characteristic having a peak at a specific frequency or frequency band.

Figure 16A:
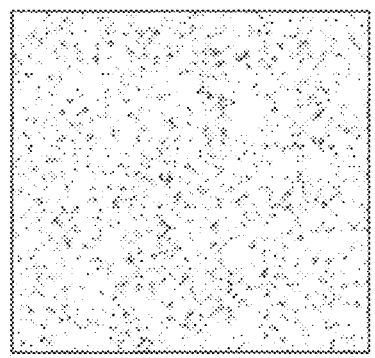
FIGS. 16A and 16B are diagrams for describing array patterns of pixels of a mask according to a third embodiment.
Figure 16B:
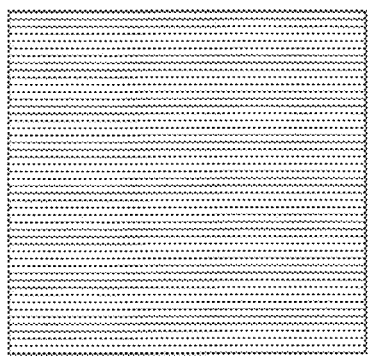

FIGS. 16A and 16B illustrates examples of array patterns of pixels allowing formation in a mask. FIG. 16A is an example of the random pattern, and FIG. 16B is an example of the simple pattern.

By use of the mask having the random pattern, an effect of averaging the pixel density of an image to be formed is obtained, and the density unevenness and the gloss unevenness of the image due to relative scanning errors in main-scanning and sub-scanning directions can be suppressed. Note that the relative scanning errors are errors of a moving speed and a moving amount of a carriage in a case of moving an ink discharge device. In a case of moving a recording medium P, the relative scanning errors are errors of a moving speed and a moving amount of the recording medium P. In the present embodiment, the mask used for the image data of an image formed with large droplets is configured with the random pattern, whereby the density unevenness and the gloss unevenness of the image formed with the large droplets are suppressed.

Meanwhile, by use of the mask having the simple pattern, the landing position accuracy of ink droplets can be improved and the coalescence of the ink droplets after landing can be suppressed, whereby the graininess of the image can be made favorable. In the present embodiment, the mask used for the image data of an image formed with the small droplets is configured with the simple pattern, whereby the graininess in the image formed with the small droplets is made favorable.

Note that the "mask in which the spatial frequency decreases toward the downstream side in the relative scanning in the sub-scanning direction" described in the first and second embodiments can be configured with both of the random pattern and the simple pattern. In this case, the spatial frequencies of the random pattern and the simple pattern decrease toward the downstream side in the relative scanning in the sub-scanning direction. Similarly, the "mask in which the spatial frequency is made uniform in the relative scanning in the sub-scanning direction" described in the first and second embodiments can be configured with both of the random pattern and the simple pattern. In this case, the spatial frequencies of the random pattern and the simple pattern are uniform in the relative scanning in the sub-scanning direction.

Effects other than the effects described in the present embodiment are the same as the effects described in the first and second embodiments.

Fourth Embodiment

Next, an image forming apparatus according to a fourth embodiment will be described. Note that description of the same constituent parts as the parts already described in the first to third embodiments may be omitted.

Figure 17:
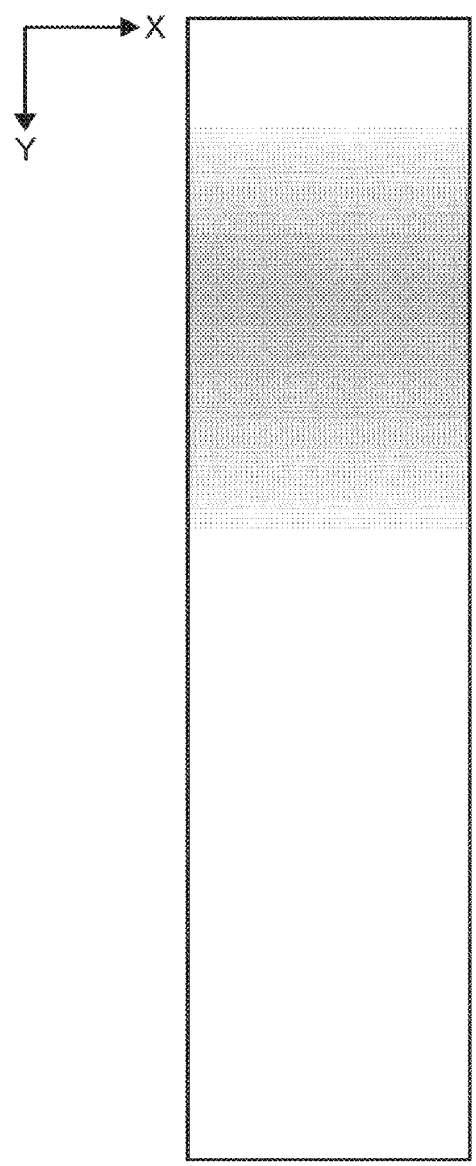
FIG. 17 is a diagram illustrating an example of a second mask according to a fourth embodiment.

In the present embodiment, a spatial frequency of a mask gradually decreases toward the upstream side in relative scanning in a sub-scanning direction. FIG. 17 illustrates an example of such a mask. Similarly to FIGS. 13A and 13B and the like, an X direction represents a main-scanning direction, and a Y direction represents a sub-scanning direction in FIG. 17.

A vicinity of an upper end portion of the mask in FIG. 17 becomes lighter toward an upper end. This indicates that the spatial frequency of the mask gradually decreases toward the upstream side in the relative scanning in the sub-scanning direction.

By doing so, the density unevenness and the gloss unevenness due to a line feed amount error in the Y direction can be decreased. The line feed error in the Y direction means an error caused in a moving amount in the Y direction in a case of causing an ink discharge device 570 to perform scanning in the X direction by one row, then moving the ink discharge device 570 in the Y direction by a predetermined moving amount and causing the ink discharge device 570 to perform scanning, and causing the ink discharge device 570 to perform scanning in the X direction by one row again. The density unevenness and the gloss unevenness are caused in the formed image due to the line feed amount error in the Y direction.

By use of the mask with the spatial frequency that gradually decreases toward the upstream side in the relative scanning in the sub-scanning direction, the density unevenness and the gloss unevenness due to the line feed amount error in the Y direction can be suppressed in the beginning of image formation, for example, by an effect of averaging the density between adjacent pixels. Thereby, image banding, that is, density fringes can be decreased.

The present embodiment can be applied to both the "mask in which the spatial frequency decreases toward the downstream side in the relative scanning in the sub-scanning direction" and the "mask in which the spatial frequency is made uniform in the relative scanning in the sub-scanning direction" described in the first and second embodiments.

Note that effects other than the above-described effect are the same as the effects described in the first to third embodiments.

Although the liquid discharge apparatuses according to example embodiments of the present disclosure have been described, embodiments of the present invention are not limited to the above embodiments, and various modifications and improvements can be made within the scope of the present invention. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. A liquid discharge apparatus comprising:
a liquid discharger configured to discharge an active energy ray curable liquid;
a curing device configured to cure the liquid;
a multi-scanning device configured to cause the liquid discharger to relatively scan a non-permeable recording medium a plurality of times in each of two directions intersecting each other to form an image, the image including pixels formed with different discharge amounts of the liquid in a region of the recording medium according to image data; and
processing circuitry configured to generate thinned image data for forming the image in the region for each relative scanning in a first direction of the two directions, using a mask in which pixels allowing image formation are arrayed,
the processing circuitry configured to generate the thinned image data such that a spatial frequency of an array of the pixels allowing image formation in the mask for a first discharge amount is uniform in relative scanning in a second direction of the two directions and the spatial frequency of the array of the pixels allowing image formation in the mask for a second discharge amount decreases toward a downstream side in the relative scanning in the second direction.

2. The liquid discharge apparatus according to claim 1, wherein the processing circuitry generates the thinned image data such that the spatial frequency of the array of the pixels allowing image formation in the mask for the second discharge amount gradually decreases toward a downstream side in the relative scanning in the second direction.

3. The liquid discharge apparatus according to claim 2, wherein the processing circuitry generates the thinned image data such that the mask for the first discharge amount has a random pattern in which the pixels allowing image formation are randomly arrayed and the mask for the second discharge amount has a simple pattern in which the pixels allowing image formation are regularly arrayed.

4. The liquid discharge apparatus according to claim 2, wherein the circuity generates the thinned image data such that at least one of the mask for the first discharge amount and the mask for the second discharge amount has a portion in which the spatial frequency gradually decreases toward an upstream side in the relative scanning in the second direction.

5. The liquid discharge apparatus according to claim 2, wherein the processing circuitry generates the thinned image data such that the second discharge amount is smaller than the first discharge amount.

6. The liquid discharge apparatus according to claim 1, wherein the processing circuitry generates the thinned image data such that the spatial frequency of the array of the pixels allowing image formation in the mask for the second discharge amount stepwisely decreases toward a downstream side in the relative scanning in the second direction.

7. The liquid discharge apparatus according to claim 6, wherein the processing circuitry generates the thinned image data such that the mask for the first discharge amount has a random pattern in which the pixels allowing formation are randomly arrayed and the mask for the second discharge amount has a simple pattern in which the pixels allowing formation are regularly arrayed.

8. The liquid discharge apparatus according to claim 6, wherein the circuity generates the thinned image data such that at least one of the mask for the first discharge amount and the mask for the second discharge amount has a portion in which the spatial frequency gradually decreases toward an upstream side in the relative scanning in the second direction.

9. The liquid discharge apparatus according to claim 6, wherein the processing circuitry generates the thinned image data such that the second discharge amount is smaller than the first discharge amount.

10. The liquid discharge apparatus according to claim 1, wherein the processing circuitry generates the thinned image data such that the mask for the first discharge amount has a random pattern in which the pixels allowing image formation are randomly arrayed and the mask for the second discharge amount has a simple pattern in which the pixels allowing image formation are regularly arrayed.

11. The liquid discharge apparatus according to claim 10, wherein the circuity generates the thinned image data such that at least one of the mask for the first discharge amount and the mask for the second discharge amount has a portion in which the spatial frequency gradually decreases toward an upstream side in the relative scanning in the second direction.

12. The liquid discharge apparatus according to claim 10, wherein the processing circuitry generates the thinned image data such that the second discharge amount is smaller than the first discharge amount.

13. The liquid discharge apparatus according to claim 1, wherein the circuity generates the thinned image data such that at least one of the mask for the first discharge amount and the mask for the second discharge amount has a portion in which the spatial frequency gradually decreases toward an upstream side in the relative scanning in the second direction.

14. The liquid discharge apparatus according to claim 13, wherein the processing circuitry generates the thinned image data such that the second discharge amount is smaller than the first discharge amount.

15. The liquid discharge apparatus according to claim 1, wherein the processing circuitry generates the thinned image data such that the second discharge amount is smaller than the first discharge amount.

16. A method of forming an image, the method comprising:

causing a liquid discharger of a liquid discharge apparatus to relatively scan a non-permeable recording medium a plurality of times both in two directions intersecting each other;

forming an image including pixels formed with discharge amounts of an active energy ray curable liquid in a predetermined region of the recording medium according to image data;

generating thinned image data for forming the image in a region for each relative scanning in a first direction of the two directions, using a mask in which pixels allowing formation are arrayed; and generating the thinned image data such that a spatial frequency of an array of the pixels allowing image formation in the mask for a first discharge amount is uniform in the relative scanning in a second direction of the two directions and the spatial frequency of the array of the pixels allowing image formation in the mask for a second discharge amount gradually decreases toward a downstream side in the relative scanning in the second direction.

17. A non-transitory recording medium storing program code for causing a liquid discharge apparatus to execute:

causing a liquid discharger of the liquid discharge apparatus to relatively scan a non-permeable recording medium a plurality of times both in two directions intersecting each other;

forming an image including pixels formed with discharge amounts of an active energy ray curable liquid in a predetermined region of the recording medium according to image data;

generating thinned image data for forming the image in a region for each relative scanning in a first direction of the two directions, using a mask in which pixels allowing formation are arrayed; and generating the thinned image data such that a spatial frequency of an array of the pixels allowing image formation in the mask for a first discharge amount is uniform in the relative scanning in a second direction of the two directions and the spatial frequency of the array of the pixels allowing image formation in the mask for a second discharge amount gradually decreases toward a downstream side in the relative scanning in the second direction.

* * * * *